United States Patent [19]
Gupta et al.

[11] Patent Number: 5,714,240
[45] Date of Patent: *Feb. 3, 1998

[54] INTEGRATED FREQUENCY CONVERSION AND SCANNER

[75] Inventors: Mool C. Gupta, Webster, N.Y.; Tuviah E. Schlesinger, Mt. Lebanon; Daniel D. Stancil, Mars, both of Pa.

[73] Assignee: Eastman Kodak Company, Rochester, N.Y.

[*] Notice: The term of this patent shall not extend beyond the expiration date of Pat. No. 5,317,446.

[21] Appl. No.: 645,973

[22] Filed: May 14, 1996

[51] Int. Cl.$^6$ ........................... B32B 9/00
[52] U.S. Cl. .................... 428/209; 428/210; 428/220; 428/913; 359/197; 359/205
[58] Field of Search .................... 428/209, 210, 428/220, 913; 359/197, 205

[56] References Cited

U.S. PATENT DOCUMENTS

| | | | |
|---|---|---|---|
| 4,614,408 | 9/1986 | Mir et al. | 350/388 |
| 5,033,806 | 7/1991 | Tomita et al. | 350/6.7 |
| 5,064,257 | 11/1991 | Shinoda et al. | 350/3.67 |
| 5,317,446 | 5/1994 | Mir et al. | 359/296 |

OTHER PUBLICATIONS

E.J. Lim, M.M. Fejer and R.L. Byer, Electron. Lett. 25, 174 (1989).

J. Webjorn, F. Laurell and G. Arvidsson, IEEE Photon. Tech. Lett. 1, 316 (1989).

"Optical Electronics" by A. Yariv, Holt, Rinehart and Winston Publisher, 3rd edition (1985), pp. 300–303.

Lotspeich, J.R., IEEE Spectrum, Feb., 1968, pp. 45–52.

*Primary Examiner*—Patrick Ryan
*Assistant Examiner*—Elizabeth Evans
*Attorney, Agent, or Firm*—Raymond L. Owens

[57] ABSTRACT

An integrated frequency conversion and scanner for converting the frequency of an input light beam and deflecting the converted light beam through an electronically controlled angle is disclosed. This structure includes an electrooptic crystal including a region formed for converting the frequency of the input light to a higher frequency; and a field changing structure associated with selected regions of the crystal arranged so that an electric field is created at least partially within the crystal to change its refractive index to thereby deflect the converted light beam through an electronically controlled angle.

7 Claims, 3 Drawing Sheets

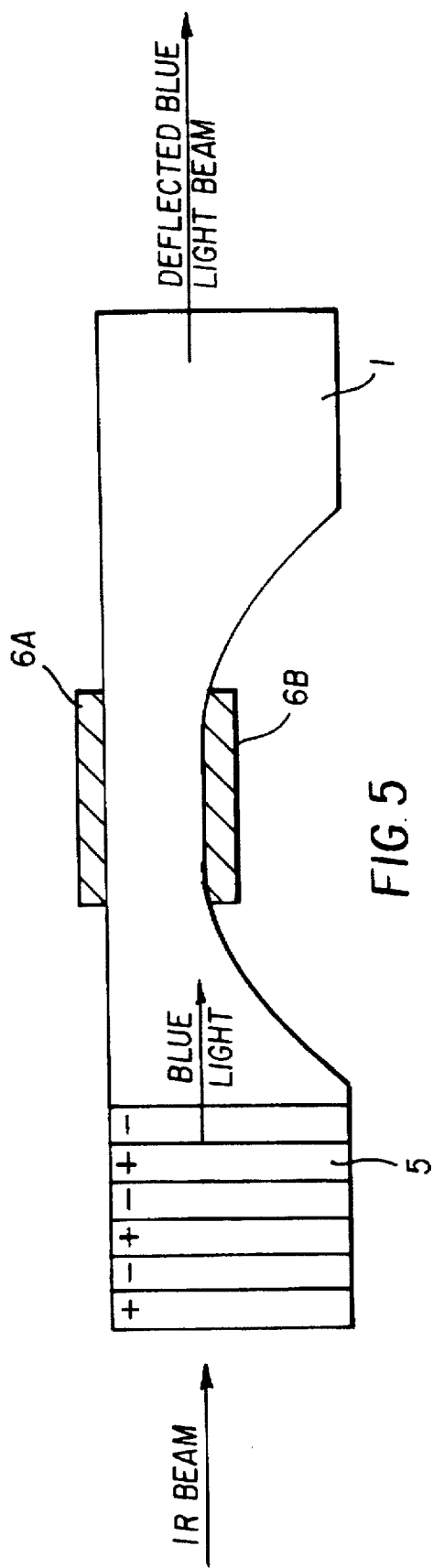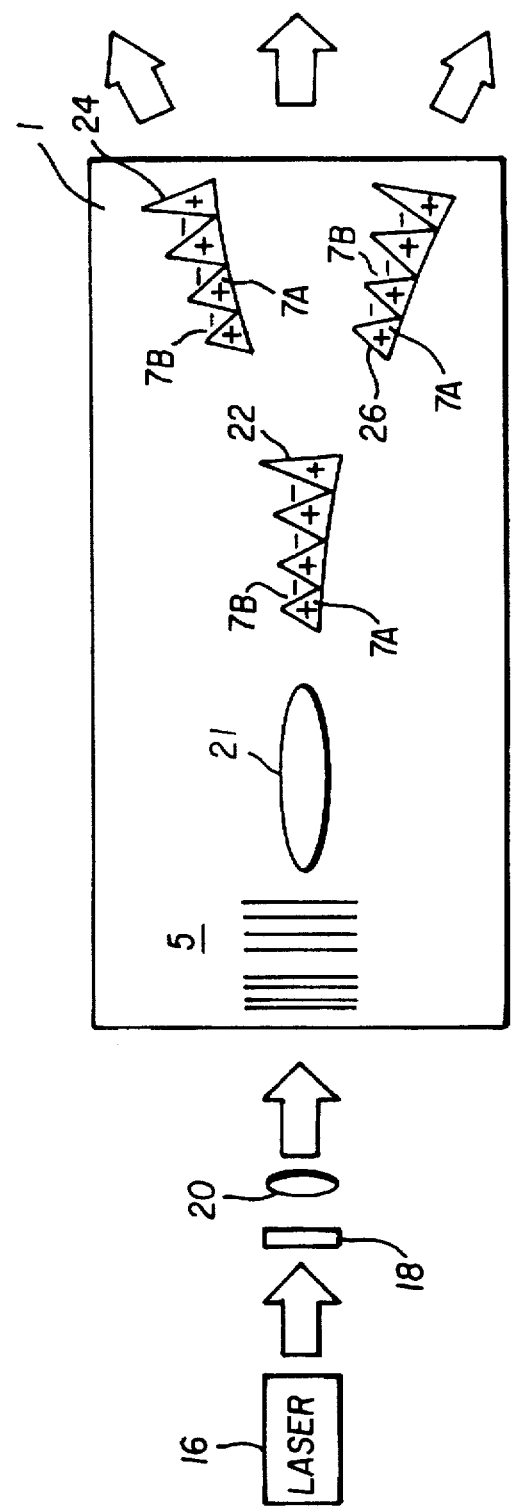

INTEGRATED FREQUENCY CONVERSION AND SCANNER

CROSS-REFERENCE TO RELATED APPLICATIONS

The present application is related to copending U.S. application Ser. No. 08/561,141 filed Nov. 21, 1995, pending to Cynthia J. Baron et al. and entitled "Forming Inverted Ferroelectric Domain Regions."

FIELD OF THE INVENTION

This invention relates generally to electrooptic scanners which scan a wavelength of light that is produced from a different wavelength of light.

BACKGROUND OF THE INVENTION

Short wavelength laser sources are useful in a variety of applications including optical recording. They significantly improve the information storage density in comparison with storage density achievable with red or near infrared laser sources. Currently, a second harmonic generation method is used for the fabrication of short wavelength laser sources. In the second harmonic method, a near infrared laser frequency is doubled by passing the light through a nonlinear crystal ((see E. I. Lim, M. M. Fejer and R. L. Byer, Electron. Lett. 25, 174 (1989) and J. Webjorn, F. Laurell and G. Arvidsson, IEEE Photon. Tech. Lett. 1,316 (1989)).

The second harmonic conversion efficiency is improved by passing the infrared light through a nonlinear crystal which is periodically poled. In periodic poling the ferroelectric domains are aligned by the application of an electric field. The periodic poling method allows for the satisfaction of the phase matching condition so that long interaction lengths (~mm) are achievable for the generation of high laser powers.

The nonlinear crystals described above can also be used for deflection of the optical beam by an electrooptic method ("Optical Electronics" by A. Yariv, Holt, Rinehart and Winston Publisher, 3rd edition (1985), pp. 300–303). In the electro optic method a voltage signal is applied to the crystal such that the optical refractive index increases in selected regions of the crystal and decreases in other regions of the crystal. Hence, by controlling the refractive index by the application of an electric field, it is possible to deflect the optical beam passing through the crystal. The deflection of the optical beam can be useful for applications such as optical storage, printing, displays, switching, and routing of optical signals.

A method for beam deflection using an electrooptic method is described in U.S. Pat. No. 5,317,446 issued May 31, 1994 to Mir et. al. In this method a voltage is applied across a poled crystal such that a uniform applied voltage increases the refractive index in selected poled regions and decreases the index in other regions.

Another useful form of the electrooptic scanner uses a series of prisms arranged in a line with alternating prisms oriented with their apexes pointing in opposite directions. A prism scanner of this type is described in Lotspeich, J. R., IEEE Spectrum, February, 1968, pp. 45–52. In this paper, Lotspeich describes the use of many identical discrete electrooptic prisms in a row to deflect laser beams by applying a voltage to a pair of parallel strip electrodes aligned above and beneath the iterated-prism array.

Even though discrete crystal or bulk deflectors such as the ones described by Lotspeich are useful, they are bulky and require high operating voltages. They are also expensive and difficult to integrate into systems that are manufactured in large quantities. To circumvent these disadvantages, deflectors which use planar or waveguide geometries have been developed. The field of integrated optics involves the integration of optical functions such as discrete modulators, interferometers, deflectors, and imaging elements on planar substrates. Many advantages can be realized from planar integration: compactness, multifunctionality, monolithic integration, and lower driving voltages. Planar versions of electrooptic prism deflectors have been disclosed in U.S. Pat. No. 4,614,408. Other related planar or waveguide electrooptic methods for deflecting light beams are described by Sarraf, Brophy et al., Stevens, and Makoto et al. Stevens uses arrays of electrooptic prism elements in waveguide structures, while Sarraf, Brophy, and Makoto et al. induce deflection of light beams by spatially modulating the refractive index of a waveguide.

Two types of electrooptic effects may be utilized for scanner applications: the first in which the index change is linearly dependent on the electric field is referred to as linear or Pockels; the second in which the index change is quadratically dependent on the electric field is referred to as quadratic or Kerr. In either case, an electric field induces a change in refractive index across an interface, thereby changing the angle of refraction of a light beam at said interface. For a nonlinear material the change in refractive index, $\Delta n$, may be simply given by where n is the unperturbed refractive index of the crystal;

r is the linear electrooptic coefficient; and

E is the magnitude of the applied electric field.

The above expression is further complicated by the fact that electrooptic materials tend to be anisotropic and, consequently, the electrooptic coefficient is a tensor quantity.

Many useful electrooptic materials are ferroelectric. They exhibit a residual polarization which can be induced electrically by subjecting the material to a high field. Lithium niobate crystals, for example, are typically poled along the thickness of the crystal before they are used for device fabrication. In these linear electrooptic materials, the sign of the electrooptic coefficient, r, and hence the sign of $\Delta n$ depends on the direction of the applied electric field relative to the poling direction.

The refraction angle at an interface between two adjacent regions with different refractive indices will vary according to the familiar Snells' Law, $$n_1 \sin (\Phi_1) = n_2 \sin (\Phi_2) \qquad \text{Eq. 2}$$

where $n_1$ and $n_2$ are refractive indices in regions 1 and 2; and $\Omega_1$, $\Phi_2$ are the corresponding angles of the light beams in region 1 and 2, respectively, measured relative to the surface normal. Although the refraction of light across interfaces may be more elegantly and generally described by analyzing the phase difference induced by refractive index discontinuities across region interfaces, Snell's law will be adequate for our purposes.

Index discontinuities commonly occur when two dissimilar media are in contact with each other, for example, at an air-water interface. In electrooptic materials, index changes can be induced electrically by applying different electric fields in adjacent regions. Since the fields may be controlled by means of electrodes, the angle of refraction may be modulated in response to a voltage signal. This principle is widely used for the design and fabrication of electrooptic deflectors as known in the art.

Numerous electrooptic materials have been described in the literature for use in electrooptic scanner applications. Potassium dihydrogen phosphate (KDP), lanthanum-modified lead zirconate titanate (PLZT), potassium titanyl phosphate (KTP), potassium tantalate phosphate (KTN), barium titanate ($BaTiO_3$), lithium niobate ($LiNbO_3$), lithium tantalate ($LiTaO_3$), calcium sulfide (CdS), and gallium arsenide (GaAs) have all been considered or used for electrooptic beam deflection. In fact, any material which exhibits electrooptic properties can be, in principle, considered for electrooptic scanning applications.

FIG. 1 shows a schematic illustration of a typical prior art electrooptic prism scanner. A set of triangular-shaped electrodes 2 and 3 are defined on both surfaces of an electrooptic crystal 1. The electrodes on one surface are designated "A" and the electrodes on the opposite surface "B". A first voltage of +V is applied to all electrodes 2A, and a different voltage (e.g. 0) is applied to all electrodes 3A. Electrodes 2B and 3B are associated with 2A and 3A, respectively, and are aligned with electrodes 2A and 3A so as to create a sandwich which includes the electrooptic material. In this arrangement, electrodes 2B are addressed with the same voltage as used for electrodes 3A, whereas electrodes 3B are addressed with the same voltage as used in electrodes 2A. The resulting field pattern is shown in FIG. 2 which depicts a cross sectional view of the prior art device showing the vicinity around two adjacent electrodes. As a result of the applied voltage pattern, the electric field in the crystal 1 changes polarity between regions defined by electrodes 2A, 2B, and regions defined by electrodes 3A, 3B. If the electrooptic material has a linear electro optic coefficient, the effective change in the electric field causes a refractive index change proportional to the applied voltage V. Consequently, any light beam polarized will experience a refraction at each interface between regions.

Other configurations may also be considered which replace 2B and 3B with a continuous reference (e.g. ground) electrode. Although this simplifies the electrode geometry, in order to achieve the same electrode fields as in the case of FIG. 2, electrodes 2A and 3A need to be bipolar (+V and −V), thus creating a need for an additional voltage level. Furthermore, even higher fringing fields will exist across gaps which separate electrodes 2A and 3A. Since the voltage difference in this case will be twice, it will increase the danger of breakdown and other aforementioned undesirable effects.

The device shown in FIG. 1 and FIG. 2 can be used either in a "bulk" mode, where the light propagates throughout the electrooptic crystal 1, or in a waveguide mode, where a thin waveguide layer, not shown, is formed on the surface of the body and the deflected light beam 4 propagates through the electrooptic crystal 1.

For efficient second harmonic generation in nonlinear crystals such as $LiTaO_3$ the crystals are periodically poled (antiparallel) in regions so that the phase matching condition is satisfied. The period of the poled grating is dependent upon the incident light wavelength and the dispersion of the material as given below $$Period=(wavelength)/(2(n^{2\omega}-n^{\omega}))\qquad Eq.\ 3$$

where $n^{2\omega}$ is the refractive index of the crystal at the second harmonic frequency and $n^{\omega}$ is the refractive index at incident light frequency. For example for generation of 425 nm light using 850 nm incident light the period required is 3.6 µm for a $LiTaO_3$ crystal. One method for creating such a grating has been described in copending U.S. application Ser. No. 08/260,935 filed Jun. 16, 1994 by Cynthia J. Baron et al. entitled "Forming Inverted Ferroelectric Domain Regions." The length of the poled region is typically a few millimeters. The second harmonic generated powers achieved is on the order of 10's of milliwatts. This power is achieved when light is confined into a waveguide region. The waveguide region is typically a few microns by a few microns in cross section and a few millimeters in length.

Another way to generate blue light is by focusing the incident light inside the wafer. Typically the depth of focus is made equal to the length of the crystal. A few milliwatts of second harmonic power can be achieved by focusing a few hundred milliwatts of incident light.

SUMMARY OF THE INVENTION

It is an object of the invention to provide an integrated structure for use in optical storage, display, and printing applications where a short wavelength light is produced by second harmonic generation and the frequency converted beam is deflected.

This object is achieved by an integrated frequency conversion and scanner for converting the frequency of an input light beam and deflecting the converted light beam through an electronically controlled angle, comprising:

a) a crystal including a region formed for converting the frequency of the input light to a higher frequency; and b) means associated with selected regions of the crystal arranged so that an electric field is created at least partially within the crystal to change its refractive index to thereby deflect the convened light beam through an electronically controlled angle.

Advantages

The present invention is especially advantageous because it can be easily fabricated using well known linear electrooptic crystals and microfabrication techniques. The structure can be implemented using both thin film waveguides or bulk electrooptic materials.

It is a feature of this invention to provide an integrated monolithic device which provides both frequency conversion and beam deflection.

Another feature of this invention is that it produces a compact short wavelength source with a beam deflector.

A still further feature of this invention is that low voltages can be applied for electrooptic beam deflection.

Another feature of this invention is that large beam deflection can be achieved by an integrated structure.

BRIEF DESCRIPTION OF THE DRAWINGS

FIG. 5 is another cross sectional view of another preferred embodiment of an integrated second harmonic generator and scanner in which the substrate has been thinned to increase the scanning sensitivity; and FIG. 6 is top view of a still further embodiment of an integrated second harmonic generator and a plurality of scanners in accordance with the present invention.

DETAILED DESCRIPTION OF THE INVENTION

Although the present invention describes a frequency doubling device based on nonlinear crystals, it will be understood by those skilled in the art that the present invention is applicable to higher harmonic generations, sum frequency generation, difference frequency generation, optical parametric oscillation using nonlinear crystals, and optical fiber lasers. See, for example, Chapter 1 of Boyd, *Nonlinear Optics* (1992).

Figure 1:
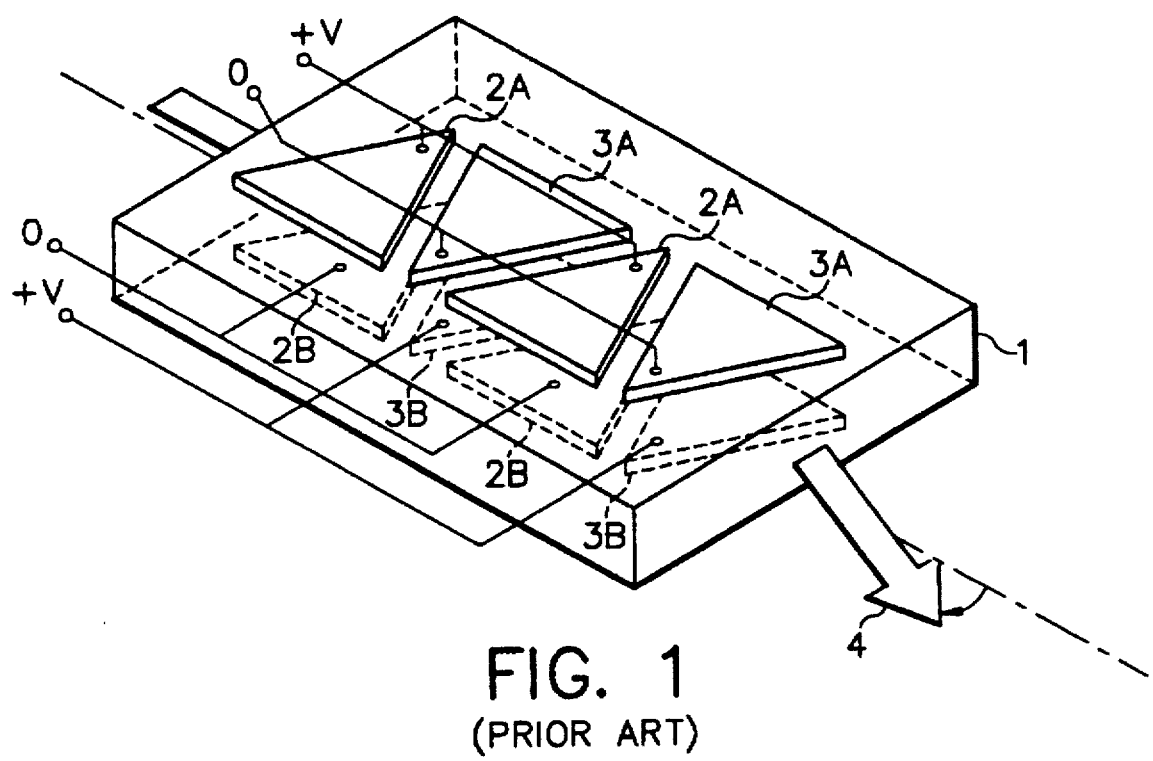
FIG. 1 is a schematic perspective view of a typical prior art electrooptic prism scanner.
Figure 2:
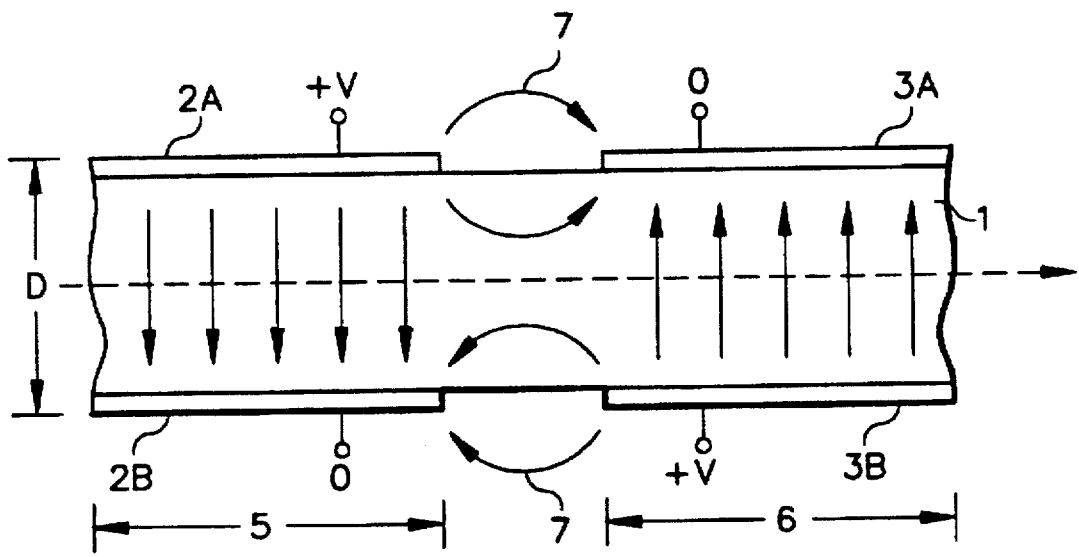
FIG. 2 is a cross sectional view of the electrooptic prism scanner of FIG. 1.
Figure 3:
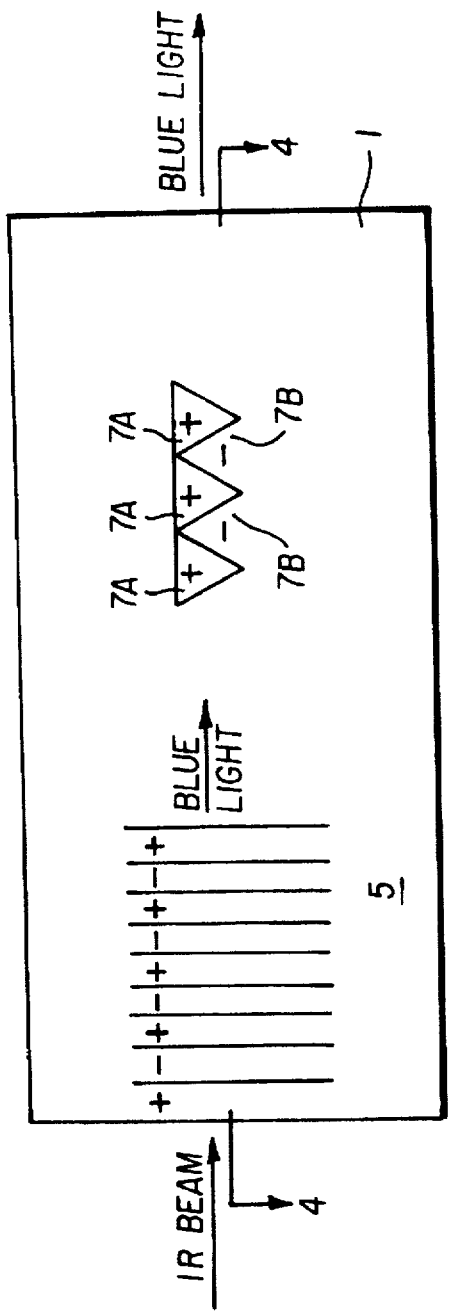
FIG. 3 is a schematic top view illustrating an integrated harmonic generator and scanner in accordance with the present invention.
Figure 4:
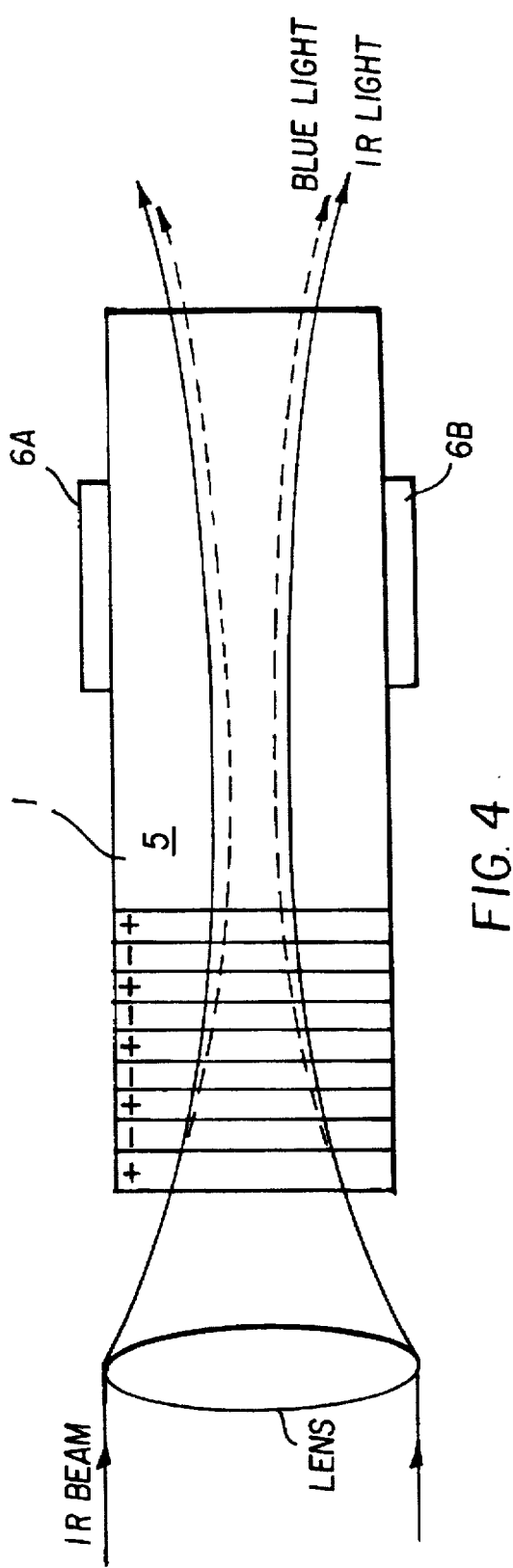
FIG. 4 is a cross sectional view taken along the lines 4-4 of the scanning device of FIG. 3.

Referring to FIG. 3 and FIG. 4, a preferred embodiment of the present invention will now be described. Where parts correspond to FIG. 1 and FIG. 2, the same numbers will be used. A monolithic electrooptic crystal 1, which was originally uniformly poled in one direction normal to the crystal surface, contains two sets of triangular electrodes 2 and 3.

As shown in FIG. 3 and FIG. 4, a scanner is provided integrated in the crystal 1. Also integrated in the crystal 1 is a selected region 5, a harmonic converter. Triangular defining portions or regions 7A are poled in one direction (+) separated by the triangular regions 7B which are poled in the antiparallel direction (−). These minus regions are, of course, the same as the original direction that the crystal 1 was poled. These triangular regions 7A and 7B could extend through the entire thickness of the crystal 1. Electrodes 6A and 6B are preferably formed on the crystal 1 over the triangular regions 7A and 7B. It will be understood that the arrangement of FIG. 2 could also have been used in accordance with the invention. A feature of the arrangement shown in FIG. 3 and FIG. 4 is that a uniform voltage can be applied to the electrodes 6A and 6B to create a uniform electric field within the crystal under these electrodes which changes the refractive indices at the interface of the triangular regions which cause the beam to deflect. By changing the voltage applied to the electrodes 6A and 6B, the refractive indices of the crystal are changed and the light beam can be deflected through a desired angle. The electrodes 6A and 6B are preferably uniformly thick when formed on the crystal.

As described above in connection with FIG. 1 and FIG. 2, the second harmonic region 5 is created in the electrooptic crystal 1 which includes an alternating poled region in which portions are poled in the opposite direction as of the remaining part of electrooptic crystal 1. As set forth in the above referenced commonly assigned U.S. application Ser. No. 08/561,141 filed Nov. 21, 1995 to Cynthia J. Baron et at, the disclosure of which is incorporated by reference herein, this arrangement causes a frequency conversion of an input light beam. For example, an IR entering beam will be converted to blue light. Accordingly, it is an important feature of the invention that in a single monolithic electrooptic crystal there is provided both frequency conversion and beam deflection.

In FIG. 5 a schematic of another embodiment of a combined second harmonic generator and scanner in the same crystal is shown. In this arrangement, the crystal 1 is thinned in the regions under the electrodes 6A and 6B. The thinned portion is selected so that its width under the electrodes 6A and 6B is thinner than the poled region 5. This is advantageous since it requires lower electrode voltages for beam deflection than in the arrangement of FIG. 3 and FIG. 4. It should be noted that the electrode field is given by the equation E=V/D where V is the applied electrode voltage and D is the thickness of crystal 1.

In FIG. 6 another integrated converter and scanner is shown. In this arrangement, a laser 16 provides a collimated beam of light to a polarizing device 18. After the polarizing device 18 is a lens 20 which collimates or focuses. Within the electrooptic crystal 1 there is provided the second harmonic generator region 5 which has previously been discussed. A collimating lens 21 is also formed in the crystal 1 (by changing its refractive index to provide a lens as is well known in the art) and directs the collimated beam of frequency doubled light to a first electrooptic beam deflector or scanner 22, shown schematically. Each beam deflector can, of course, take the form of FIG. 1 and FIG. 2. Preferably, however they would take the form of FIG. 3 or FIG. 4. As the beam of light is deflected by the scanner 22, it encounters separate beam scanners or deflectors 24 and 26 and this arrangement permits a wider angle of beam deflection. Although only two additional deflectors 24 and 26 are shown, those skilled in the art will appreciate that more deflectors can be used.

The invention has been described in detail with particular reference to certain preferred embodiments thereof, but it will be understood that variations and modifications can be effected within the spirit and scope of the invention.

PARTS LIST 1 electrooptic crystal
2A electrodes
2B electrodes
3A electrodes
4 deflected light beam
5 second harmonic generator region
6A electrode
6B electrode
7A triangular region
7B triangular region
16 laser
18 polarizing device
20 lens
21 collimating lens
22 scanner
24 beam deflector
26 beam deflector

We claim:

1. An integrated frequency converter and scanner for converting the frequency of an input light beam and deflecting the converted light beam through an electronically controlled angle, comprising:

a) an electrooptic crystal including a region formed for converting the frequency of the input light to a higher frequency;

b) means associated with selected regions of the crystal arranged so that an electric field is created at least partially within the crystal to change its refractive index to thereby deflect the converted light beam through an electronically controlled angle; and c) lens means formed within the crystal between the frequency converting region and the field creating means.

2. An integrated frequency converter and scanner for converting the frequency of input light and deflecting the converted light beam through an electronically controlled angle in response to the application of an electric field, comprising:

a) an electrooptic crystal including an alternately poled region for converting the frequency of input light beam to a desired frequency;

b) a scanner in the crystal having first and second antiparallel poled ferroelectric regions spaced from the alternatively poled regions; and c) electrode means associated with the first and second antiparallel poled regions so that upon the application of an electrical signal to the electrode means, an electric field is created to change refractive indices to thereby deflect the frequency converted beam.

3. The invention as set forth in claim 2 wherein the alternatively poled regions are triangular and extend substantially through the entire thickness of the crystal.

4. The invention as set forth in claim 2 wherein the crystal has a thin region selected so that its width under the electrode means is thinner than the surrounding regions.

5. The invention as set forth in claim 2 including lens means formed within the crystal between the scanner and the electrode means.

6. The invention as set forth in claim 2 wherein the scanner includes a plurality of cascaded electrooptic beam deflectors for providing large beam deflection angle.

7. An integrated frequency conversion and scanner for converting the frequency of input light and deflecting the converted light beam through an electronically controlled angle in response to the application of an electric field, comprising:

a) an electrooptic crystal including alternatively poled regions in the monolithic body for doubling the frequency of input light to a desired frequency;

b) lens means in the crystal for collimating the desked frequency light; and c) electrooptic deflector means formed in the crystal including at least two electro optic deflectors for sequentially receiving and scanning the collimated desired frequency light.

\* \* \* \* \*